Oct. 8, 1940.  J. D. WARFIELD, JR  2,217,392
METHOD OF PACKAGING CHOCOLATE
Filed Aug. 10, 1938  2 Sheets-Sheet 1

Inventor:
John D. Warfield Jr.

Oct. 8, 1940.   J. D. WARFIELD, JR   2,217,392
METHOD OF PACKAGING CHOCOLATE
Filed Aug. 10, 1938   2 Sheets-Sheet 2
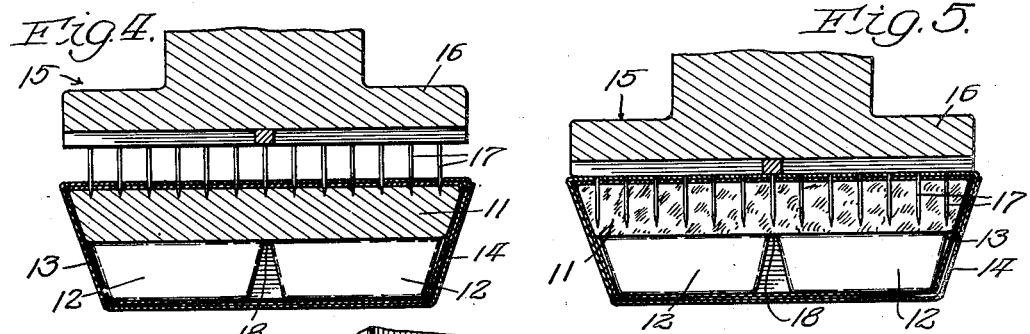
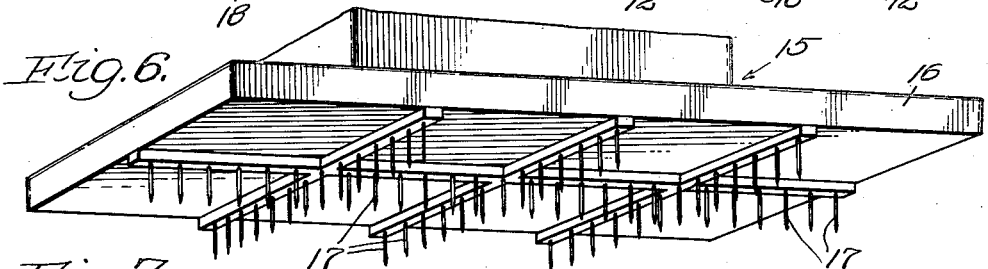
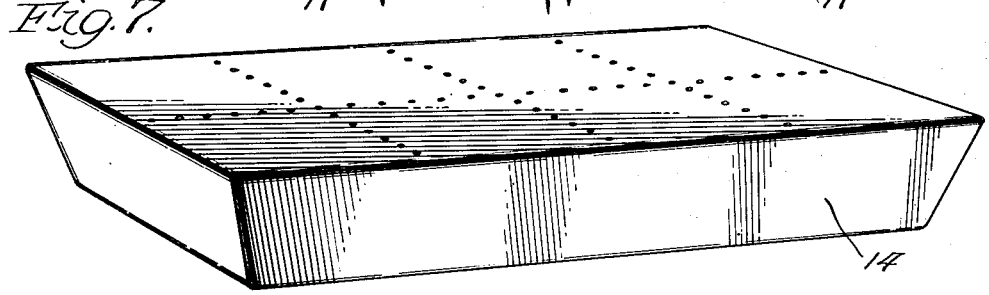
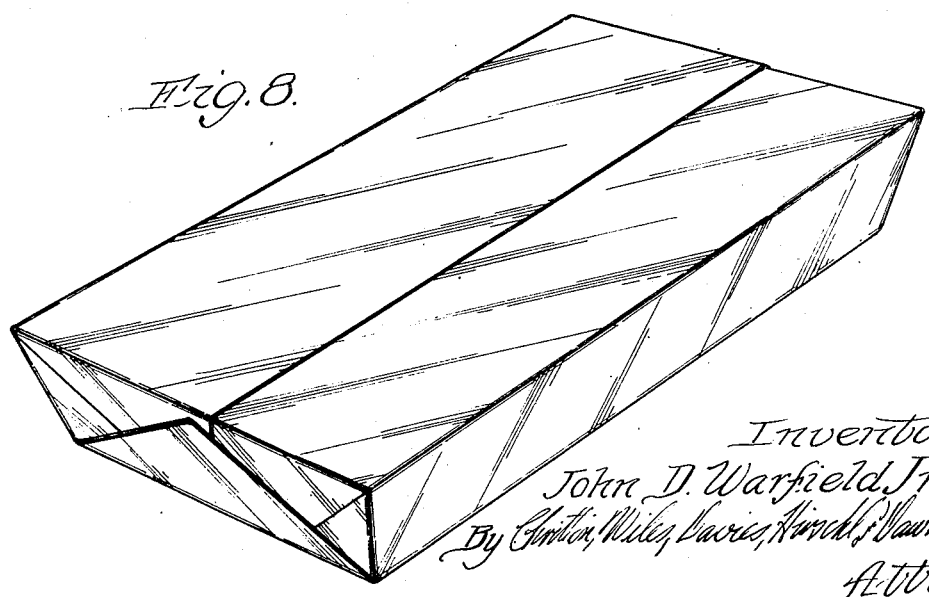
Inventor:
John D. Warfield Jr., Patented Oct. 8, 1940

2,217,392

UNITED STATES PATENT OFFICE

2,217,392

METHOD OF PACKAGING CHOCOLATE

John D. Warfield, Jr., Chicago, Ill., assignor to The Warfield Company, a corporation of Illinois Application August 10, 1938, Serial No. 224,180

2 Claims. (Cl. 99—171)

This invention relates to a method of packaging chocolate and the like, and more particularly to an improved method of preparing a packaged cake of chocolate readily separable into portions, and to the improved product of such method.

Figure 1:
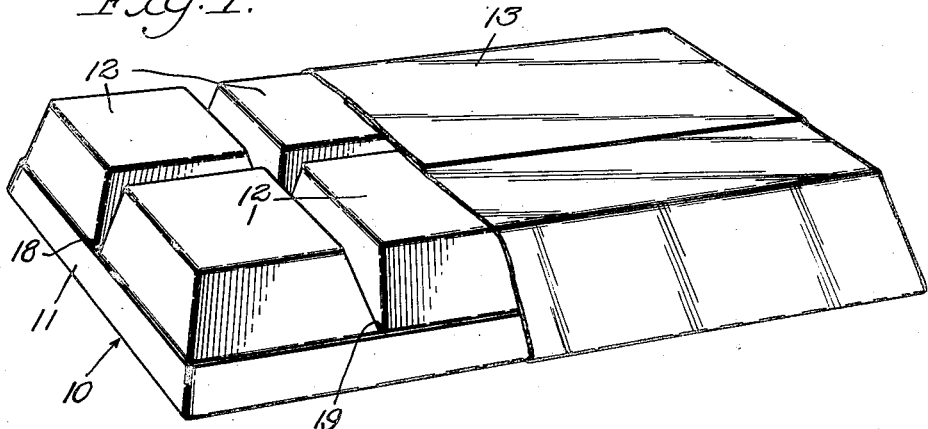
Figure 2:
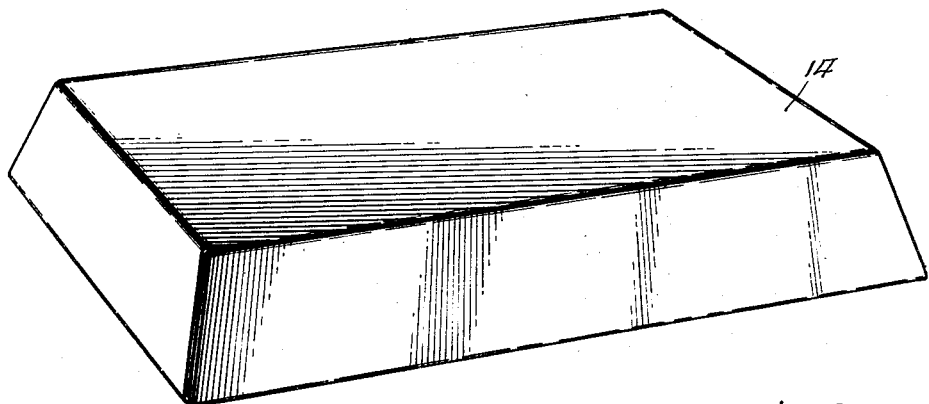
Figure 3:
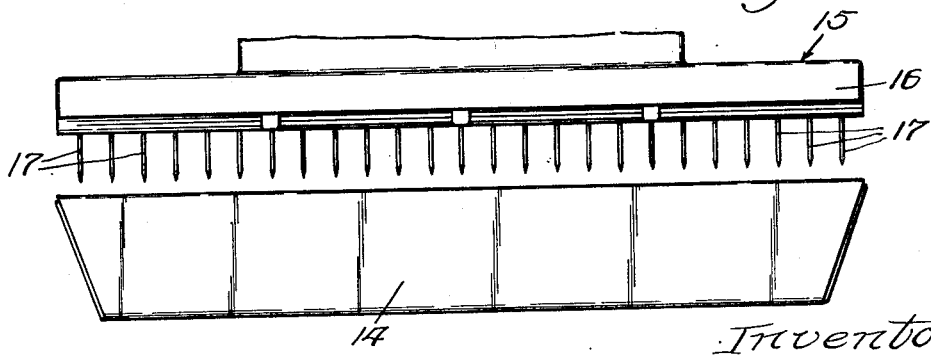

One feature of this invention is that it provides a cake of chocolate or similar material which may be conveniently formed and packaged as a unit in the process of manufacture, and which comprises unitarily packaged but completely disconnected squares when distributed to the user; another feature of this invention is that it provides an improved means for dividing a cake of molded material such as chocolate into a plurality of readily separable portions; a further feature is that the cake of chocolate may be packaged before being operated upon to divide it into the desired readily separable portions; other features and advantages of this invention will be apparent from the following specification and the drawings, in which:

Fig. 1 is a perspective view of a cake of chocolate with the wrapping partly broken away; Fig. 2 is a perspective view of the cake enclosed in a cardboard package; Fig. 3 is a side elevation of the packaged cake and packaging means; Fig. 4 is a transverse sectional view of the packaged cake and perforating means; Fig. 5 is a view similar to Figure 4 showing the perforation completed; Fig. 6 is a perspective view of the perforating device; Fig. 7 is a perspective view of the perforated packaged cake; and Fig. 8 is a perspective view of the final article of commerce.

Certain materials, and particularly chocolate of the type used in cooking, are manufactured and distributed in relatively large cake form, the user usually having need only for a portion thereof at a time. Such materials have heretofore been molded in cake form with grooves or lines of indentation dividing them into portions, and then packaged and distributed to the user; and the user had to break off the squares or portions defined by the lines of indentation. In order that the cakes might be wrapped and packaged as a unit by machine without breaking apart in the process the molding was such that the squares were joined together quite solidly, and the user, usually a housewife, generally had considerable difficulty in breaking off the desired portions.

The present invention provides a method of preparing material such as chocolate in the form of a cake adapted to be divided into squares, the cake being sufficiently solid to be wrapped and handled as a unit by machines, yet such that when it reaches the user the squares are completely disconnected from each other. This is accomplished by first forming and packaging the cake of chocolate in conventional manner, and then by perforating the packaged chocolate along lines coinciding with the grooves molded therein; thus the cake is divided into disconnected squares after the packaging has been completed. The perforated package may then, if desired, be enclosed in Cellophane or some similar moisture-proof material.

The invention comprises forming a cake of chocolate having sufficient strength to retain its unity as a cake during certain processing, then subsequently operating upon it to divide it into readily separable squares. The squares of the finished product are readily separable in the sense that the housewife may remove one square from its association with other squares of the cake with little or no force. That is, "readily separable," as used herein, is intended to include squares which are merely positioned adjacent one another but are physically completely disconnected and squares which are physically connected by a web which has been so weakened that the squares may be broken apart with practically no effort.

In the particular embodiment of the invention illustrated herewith a cake of chocolate 10 is molded or formed with a solid base portion 11, but with the upper half or more of the cake (speaking with respect to Figure 1) having grooves or lines of indentation therein dividing it into portions or squares 12. This cake may be formed in a conventional and well-known manner, and then wrapped in wax paper 13, or the like, and packaged or enclosed in a cardboard box 14, these latter steps being well-known in the art and performed by machines designed therefor.

After the cake has been formed, wrapped and packaged, it is operated upon by a perforating device 15 shown in Figures 3, 4, 5 and 6. The perforating device comprises a base 16 carrying a plurality of pins or prongs 17 having a length approximately equal to the thickness of the base portion 11 of the cake of chocolate. These prongs are arranged in rows, the prongs of each row being preferably separated by a quarter of an inch or less, and the rows being so arranged that when the perforating device 15 is properly positioned with respect to the cake of chocolate the rows or prongs coincide with the lines of indentation dividing the cake into squares. The longitudinal row of pins in the perforating device, for example, is adapted to coincide with the longitudinal groove or perforation 18 in the cake; the first transverse row of prongs (on the left side of the perforating device shown in Figure 6) is adapted to coincide with the first transverse groove or line of indentation 19 in the cake; and the other transverse rows of prongs with the other transverse grooves.

The prongs must, of course, perforate the packaged cake on the base side thereof, and in Figures 3, 4 and 5 the cake is shown with this side up and the perforating device entering from the top. It will be understood, of course, that any relative arrangement or position of the cake and perforating device may be used so long as the prongs perforate the solid or base portion thereof. Figure 4 shows the prongs just entering the chocolate, coincidentally perforating the outer cardboard box or package, the wax paper wrapping, and the material of the cake; and Figure 5 shows the prongs in finished perforating position, the squares now having broken apart as the result of the perforation by the prongs.

When the perforating device is withdrawn from the cake, as shown in Figures 6 and 7, the cake is now maintained in a unit by the outer wrapping and package, the inner squares, however, being very readily separable. In order to prevent contact of the chocolate with air or moisture through the holes in the package and wrapping left by the perforation, the packaged cake is preferably enclosed in Cellophane, or similar moisture-proof material, as shown in Figure 8, to provide the finished article of commerce for distribution to the ultimate user.

While the invention is here described and illustrated in such manner that the squares are shown as completely separated by the perforation, it will be understood that the perforating process may either completely separate them in this way, or merely so weaken the base that the squares may be broken off with practically no effort. In either case, however, the resultant cake has squares which are readily separable by the user without the necessity of the force previously necessary to break the squares apart along the lines of indentation.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:

1. The method of preparing chocolate for distribution, comprising forming said chocolate into a cake, packaging said cake, and then perforating the package and cake to divide the cake of chocolate into a plurality of readily separable portions without substantially weakening the package.

2. The method of preparing chocolate for distribution, comprising molding said chocolate into a cake, packaging said cake, and simultaneously perforating the package and cake by rows of prongs to divide the cake into a plurality of completely separate portions without substantially weakening the package.

JOHN D. WARFIELD, Jr.